(12) United States Patent
Drevet et al.

(10) Patent No.: US 8,211,188 B2
(45) Date of Patent: Jul. 3, 2012

(54) HIGH-LOAD RATE SUPERCAPACITOR ELECTRODE AND METHOD FOR OBTAINING SAME BY EXTRUSION

(75) Inventors: Hélène Drevet, Quimper (FR); Isabelle Rey, Gujan-Nestras (FR); Michel Peillet, Ergue Gaberic (FR); Frédéric Abribat, Ergue Gaberic (FR)

(73) Assignee: Batscap, Ergue Gaberic (FR)

( * ) Notice: Subject to any disclaimer, the term of this patent is extended or adjusted under 35 U.S.C. 154(b) by 842 days.

(21) Appl. No.: 11/883,451

(22) PCT Filed: Jan. 30, 2006

(86) PCT No.: PCT/EP2006/050527
§ 371 (c)(1),
(2), (4) Date: Jan. 14, 2009

(87) PCT Pub. No.: WO2006/082172
PCT Pub. Date: Aug. 10, 2006

(65) Prior Publication Data
US 2011/0128666 A1 Jun. 2, 2011

(30) Foreign Application Priority Data
Feb. 1, 2005 (FR) ...................................... 05 00971

(51) Int. Cl.
*H01G 9/00* (2006.01)
(52) U.S. Cl. ...................................................... 29/25.03
(58) Field of Classification Search ................... 29/25.03
See application file for complete search history.

(56) References Cited

U.S. PATENT DOCUMENTS

| 7,256,099 B2 * | 8/2007 | Takahashi et al. ............ 438/400 |
| 2002/0054472 A1 | 5/2002 | Ishikawa et al. |
| 2002/0136887 A1 | 9/2002 | Penneau et al. |

FOREIGN PATENT DOCUMENTS

| EP | 0685859 | 12/1995 |
| EP | 0933791 | 8/1999 |
| FR | 2759087 | 8/1998 |

OTHER PUBLICATIONS

Amatucci, Glenn G. "*An Asymmetric Hybrid Nonaqueous Energy Storage Cell*"; Journal of the Electrochemical Society, 148; pp. A931-A939; 2001.
Pasquier, Aurelian Du. "*A Nonaqueous Asymmetric Hybrid $Li_4Ti_5O_{12}$ /Poly (fluorophenylthiophene) Energy Storage Device*"; Journal of the Electrochemical Society, 149; pp. A 302-A306 2002.

* cited by examiner

*Primary Examiner* — Seahvosh Nikmanesh
(74) *Attorney, Agent, or Firm* — Blakely, Sokoloff, Taylor & Zafman

(57) ABSTRACT

The invention concerns a method for making a porous substrate-electrode complex (6) with load rate not less than 80% for a supercapacitor including at least the following steps: preparing a mixture containing at least one polymer (1), at least one liquid pore-forming plasticizer (3), and at least one active filler (2); extruding the mixture in paste form; depositing the paste on the substrate and laminating same; and treating the resulting complex to eliminate all or part of the plasticizer (3) and generate porosity in the electrode. The invention also concerns an electrode paste and a collector-electrode complex.

48 Claims, 5 Drawing Sheets

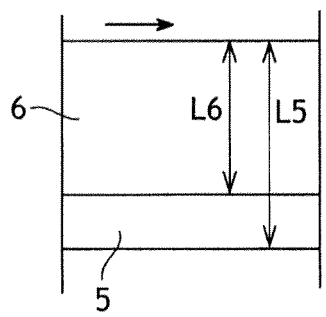
FIG. 5
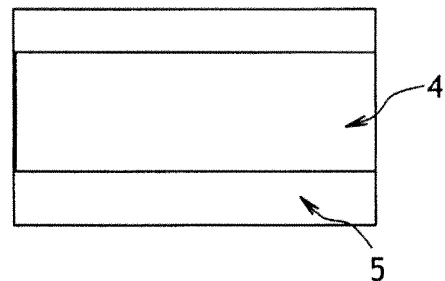
FIG. 6
FIG. 7a
FIG. 7b
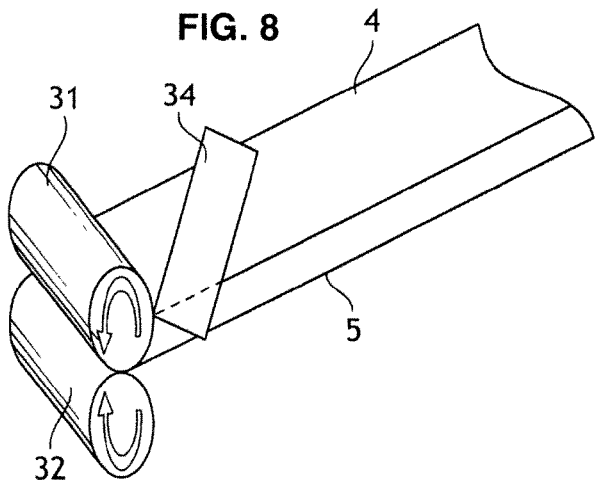
FIG. 8
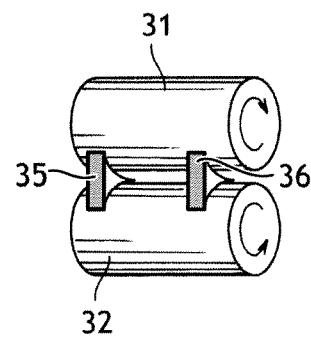
FIG. 9

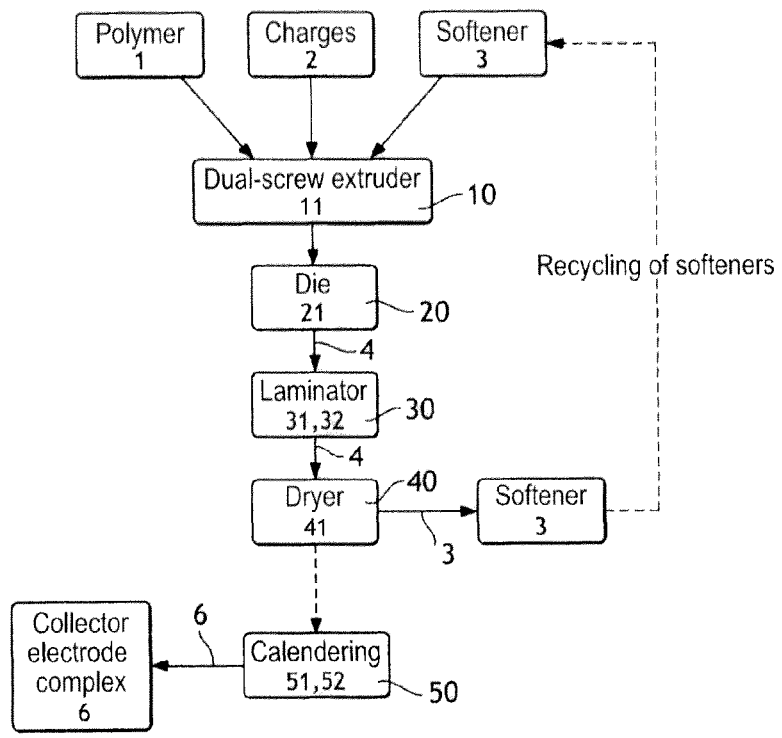
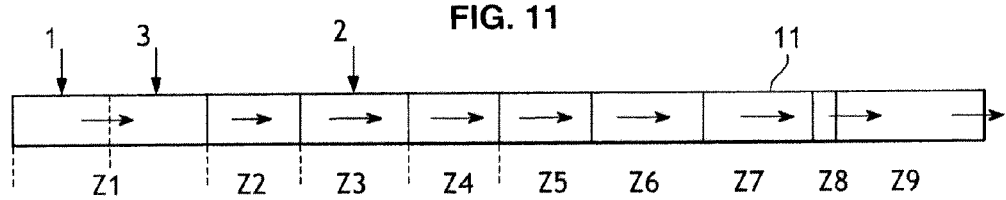
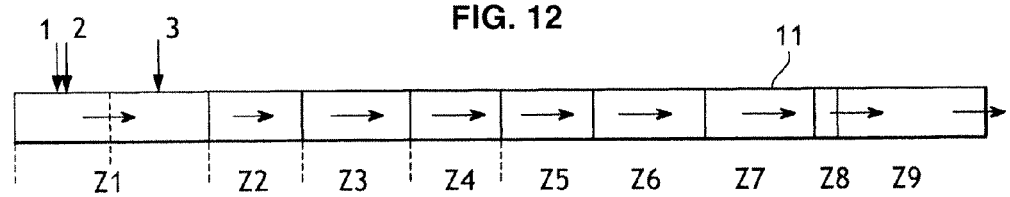

Gel extrusion technology

Dry extrusion technology method
(molten polymer)

PTFE-based technology

Evolution of elastic module (G') as a function of frequency (w)

HIGH-LOAD RATE SUPERCAPACITOR ELECTRODE AND METHOD FOR OBTAINING SAME BY EXTRUSION

This is a non-provisional application claiming the benefit of International application number PCT/EP2006/050527 filed Jan. 30, 2006.

The present invention relates to the field of electric power storage devices.

More precisely, the present invention applies to the manufacture of supercondensers made up of multilayer windings or stacking.

These electrochemical elements generally comprise layers of electrodes between which is interposed a separator layer, the layers being impregnated by a liquid electrolyte. Metallic films adjacent to the electrodes act as current collector.

In particular, the present invention applies to the manufacture of a supercondenser electrode deposited on a current collector film.

The document US 2002/0054472-A (published on 9 May 2002) describes a process for making an electrode for a double-layer electric condenser. The process consists of extruding a mixture comprising a carbon material, PTFE and a non-softening additive destine to lubricate the polymer to facilitate extrusion (processing aid), laminate the mixture to form a film and dry the film to eliminate the additive. In this process, the extruded mixture is in the form of a paste to form a self-supported film on exit. The process requires complex drawing operations to fibrillate the PTFE contained in the mixture so as to obtain therefrom the desired mechanical properties for a self-supported film.

The document FR 2 759 087-A (published on 7 Aug. 1998) describes an extrusion process <<without solvent>> for making films of self-supported electrodes. The process consists of forming a mixture of polymers and carbonated active charges, the mixture containing insoluble polymers and one or more soluble or calcinable polymer. The mixture is extruded, and then the soluble or calcinable polymer(s) is/are eliminated to form pores.

This process leads to a self-supported electrode film whereof the specific surface and the mass capacity are low, due to the continuous morphology of the electrode and the rate of charges limited to 60% by the dry extrusion method process, which does not extrude polymers more heavily charged, under penalty of losing the mechanical performance of the film.

The document US 2002/0093783 (published on 18 Jul. 2002) describes a process for making an electrode structure. The process consists of depositing on a collector film two layers of carbon including a first layer based on conductive carbon and a second layer based on active carbon. In this process, each layer is deposited successively by enduction in the form of a paste containing a solubilised and carbonated polymer bond, then the final complex is dried.

Enduction processes for making supercondenser electrodes with a softener which is eliminated during the manufacturing process are also known. Reference could be made in this respect to the following publications.

U.S. Pat. No. 6,327,136
<<An asymmetric Hybrid Nonaqueous Energy Storage Cell>>, Glenn G. Amatucci et al—Journal of The Electrochemical Society, 148 (8) A930-A939 (2001)
<<A Nonaqueous Asymmetric Hybrid $Li_4Ti_5O_{12}$/Poly (fluoro phenyl thiophene) Energy Storage Device>> Aurelien of the Pasquier et al—Journal of The Electrochemical Society, 149 (3) A302-A306 (2002)

These processes generate continuous matrix products due to utilisation of polymer bonds dissolved in a solvent, resulting in low accessibility of ions to carbonated charges, low density and excessively high series resistance, as confirmed by the study "Development and characterization of Ni—C Supercapacitor" by Malmberg, Bursell, Björnbom, and Lundblad, KTH presented at the ESSCAP 2004 Belfort Congress.

An aim of the invention is to propose a manufacturing process by gel extrusion of an electrode film deposited on a current collector to form an electrode-collector complex, in the presence of a liquid porogenic softening agent, increasing the proportion of active charges and creating the porosity in the electrode after total or partial elimination of the softener.

To do this, the invention provides a manufacturing process of a porous substrate electrode complex at a charge rate greater than or equal to 80% for a supercondenser comprising at least the steps consisting of:
preparing a mixture containing at least a polymer, at least a liquid porogenic softening agent, and at least an active charge,
extruding the mixture in the form of paste,
depositing the paste on the substrate and laminating it,
treating the complex thus formed to eliminate all or part of the softening agent and create porosity in the electrode.

This process of gel extrusion easy to implement requires no fibrillation step of the bond, as is required by utilisation of PTFE according to the prior art.

Gel extrusion is known as the extrusion process of a mixture containing inter alia a polymer and a liquid softening agent of this polymer for making a gel during the extrusion process.

Gel is referred to when a liquid and a polymer are mixed and when the liquid is a weak solvent of polymer or when the quantity of liquid present in the mixture is insufficient to completely solubilise the polymer. Part of the liquid is miscible with the polymer, and the other is not. The liquid softening agent is a compound liquid at transformation temperatures, which has miscibility with polymer, such that mixing both produces a gel. Due to its partial miscibility with polymer, the liquid acts as a softener and diminishes the viscosity of the polymer and acts to utilise it by processes requiring flow of the mixture, such as extrusion processes. The low viscosity of the gel incorporates a high rate of charge in the mixture. The viscosity acceptable by the extrusion processes is however higher than for enduction processes, which engenders a lower necessary quantity of softener. This translates into a stronger density of the mixture.

Due to its partial miscibility with polymer, the liquid is trapped inside the polymer. During elimination of the liquid softener, a porous matrix is thus made. By comparison, a mixture constituted by a polymer and a good solvent of the polymer, as is the case in enduction processes, results in the fabrication of a continuous polymer matrix after elimination of the solvent.

This is illustrated by FIG. 1, in which FIG. 1a shows the porosities created in the matrix according to the invention by elimination of the liquid softener, while FIG. 1b illustrates by comparison a matrix obtained by enduction after total elimination of the solvent according to the prior art.

The matrix bonded in the case of enduction is continuous around grains of charges, whereas the matrix bonded in the case of gel extrusion is dispersed in the form of clusters of polymeric chains between the grains of charges, thus freeing up access to a large active surface.

Another aim of the invention is to prepare by gel extrusion a paste for making an electrode in the form of a gel and entering the manufacture of a substrate/electrode complex for a supercondenser to give the latter characteristics of low series resistance and high volume capacity. The purpose consists of depositing the electrode paste on a substrate so as to make either a collector/electrode complex, or an electrode/collector/electrode complex, or a separator/electrode complex.

Accordingly, the invention aims to make an electrode paste, for a supercondenser, at a charge rate of between 25% and 45%, comprising a mixture containing at least a polymer, at least a liquid softening agent, and at least an active charge, such that the rate of softener in mass is between 50 and 70% and the paste is in the form of a gel having an elasticity module of between $10^4$ and $10^8$ Pascal, at extrusion temperatures, in a range of frequencies of between 0.01 and 100 Hz.

The active charges designate active carbon, in the form of powders or fibres.

Active carbon is a carbon material of large specific surface, between 500 and 3000 $m^2/g$, made by chemical or physical activation of natural or synthetic carbon. In supercondenser applications, active carbons of specific surface of between 1000 and 2500 $m^2/g$ will preferably be selected.

The mixture may contain an electronic conductive additive. This electronic conductive additive, selected from acetylene black, carbon black or graphite, is advantageously introduced to the mixture to decrease the resistivity of the substrate-electrode complex. The electrode can comprise one or more charges.

According to a variant execution, the charges can include oxides of transition metals such as oxides of titanium, ruthenium, manganese, nickel, molybdenum, tungsten, cobalt, chromium, iron or vanadium for the purpose of making electrodes of hybrid supercondensers combining farad processes with capacitive processes for creating electrochemical double-layers.

According to a variant execution, the charges can include carbon nanotubes offering high-capacity performances.

According to the invention, the rate of charges in the electrode is greater than or equal to 80% in mass, and the additive conductivy content is at least equal to 5% in mass.

The polymer(s) act(s) as a bond of the grains of charges, landing the electrode cohesion, flexibility, and participating in adhesion on the substrate. It can be selected from the family of fluoropolymers. For example, the polymer can be a polyvinylidene difluoride (PVDF), or a copolymer of vinylidene fluoride and hexafluoropropylene (HFP), or a copolymer of vinylidene fluoride and chlorotrifluoroethylene (CTFE), at a level of 50% at most of HFP or CFTE monomer copolymerised with the vinylidene fluoride. It can likewise be selected from the family of polyethers, or polyacrylics, such as polyoxyethylenes (POE), polymethyl methacrylate (PMMA), polyacrylonitrile (PAN). It can likewise be selected from the family of elastomers, polyvinyl copolymers, such as copolymers of styrene, butadiene, isopropene, and acrylics, such as ter-polymer styrene-butadiene-PMMA elastomers (SBM) or styrene-acrylonitrile (SAN) copolymer elastomers. The electrode can be constituted by a cited polymer or by a mixture of two or more of the cited polymers.

The liquid softener is selected from the carbonates, such as propylene carbonate, ethylene carbonate, or lactones, such as ☐-butyrolactone. It can also be selected from N-methylpyrrolidone (NMP), tetrahydrofuranne (THF), acetone, cyclohexane, dimethylformamide (DMF), acrylonitrile, dimethylsulfoxide (DMSO), or methylethylketone (MEK). The electrode can be constituted from one or more liquid softener agents.

Another aim of the invention is to make a collector-electrode paste complex for supercondenser, the electrode paste having the characteristics as described previously. The liquid softening agent can be conserved in the electrode paste to acts as electrolyte solvent of the supercondenser.

The invention likewise relates to a collector-electrode complex for supercondenser whereof the collector is a metallic film, characterised in that:
  the electrode, comprises a mixture which contains at least a polymer bond based on polyvinylidene difluoride (PVDF), in the form of homopolymer or copolymer singly or in a mixture, and at least an active charge, at a charge rate greater than or equal to 80%,
  the electrode is obtained from a paste in the form of gel having an elasticity module of between $10^4$ and $10^8$ Pascal, at extrusion temperatures, in a range of frequencies of between 0.01 and 100 Hz,
  the electrode has alveolar porosity having a specific surface greater than 400 $m^2/g$ and a rate of porosity greater than 60% in volume,
  whereof the polymer bond of the electrode is in the form of a dispersed phase of particulate or granular morphology forming a discontinuous matrix.

The purpose consists of:
making an optimised stack of one or more layers of collector-electrode complex and one or more layers of separator,
organising and spooling this stack so as to produce a winding,
impregnating this winding with a liquid organic electrolyte,
placing this impregnated winding in an adapted casing,
making the interface to produce a supercondenser.

The substrate constituting the complex is a conductive metallic film acting as current collector. The metal can be aluminium. The metallic film can be treated, mechanically or chemically. Thus, it can be surface-etched (<<etched>> according to the expression formerly accepted and used by specialists) or covered in a conductive deposit, which can be metallic or carbon, having a thickness of between 0.1 and 25 μm. This deposit will constitute a sub-layer for the electrode in the collector-electrode complex.

In the case of a metallic deposit, this will be advantageously constituted by metallic nitride or carbide whereof the conduction and anti-corrosion properties are favourable to the performance of the supercondenser.

In the case of a carbonated sub-layer, the latter will advantageously include more than 50% in mass of carbonated conductivy material for reducing the interface resistance between electrode and collector.

The conductivy sub-layer can be obtained by gel extrusion, by enduction, by pulverisation or by evaporation.

The metallic film can be treated thermally to degrease its surface. The thickness of the metallic film current collector is adapted so that the collector has a thickness of between 15 and 50 μm.

The substrate constituting of the complex can likewise be a separator film, constituted by a porous film of cellulose or polymers such as polypropylene, polyvinylidene difluoride, homopolymer or copolymer. The thickness of the separator film is between 15 and 50 μm.

The invention produces a supercondenser electrode made by a process of gel extrusion having morphology, a permeability, a porosity, and a specific surface which improve accessibility of ions to active charges and reduce the series resistance of supercondensers employing such electrodes.

This supercondenser electrode comprises a conductivy additive in such proportions that the electronic resistance of collector-electrode interface of the supercondenser is low.

In addition, this electrode has a high rate of active charges and a high specific surface.

An aim of the invention is to produce a electrode-collector-electrode complex in which the second face of the collector is covered by a second electrode layer having characteristics identical to the electrode layer of the collector-electrode complex.

The purpose here consists of:
- making an optimised stack of one or more layers of electrode-collector-electrode complex and of one or more layers of separator,
- organising and spooling this stack to produce a winding,
- impregnating this winding with a liquid organic electrolyte,
- placing this impregnated winding in an adapted casing,
- making the interface to produce a supercondenser.

The present invention likewise relates to a collector-electrode complex for a supercondenser, whereof the collector is a film of pure aluminium, etched or not, whereof the electrode contains at least 70% active carbon, and at least a bond based on fluoropolymer, and whereof the electrode comprises at least 5% in mass of additive conductivy.

Finally, the invention produces supercondensers which comprise at least a calendered electrode collector-electrode complex whereof each electrode is deposited then laminated on a metallic collector film, and whereof:
- each electrode comprises a mixture which contains at least a polymer bond based on polyvinylidene difluoride (PVDF), in the form of homopolymer or copolymer singly or in a mixture, and at least an active charge, at a charge rate greater than or equal to 80%,
- the electrode is obtained from a paste in the form of gel having an elasticity module of between $10^4$ and $10^8$ Pascal, at extrusion temperatures, in a range of frequencies of between 0.01 and 100 Hz,
- the electrode has alveolar porosity having a specific surface greater than 400 $m^2$/g and a rate of porosity greater than 60% in volume,
- the polymer bond of the electrodes is in the form of a dispersed phase of particulate or granular morphology forming a discontinuous matrix,
- the collector is a metallic film having a thickness of between 15 and 50 μm.

Other characteristics and advantages will emerge from the following description, which is purely illustrative and non-limiting and must be viewed in relation to the attached figures, in which:

FIG. 1a schematically illustrates the porosities created in the matrix according to the present invention during a gel extrusion process by elimination of the liquid softener, whereas FIG. 1b schematically illustrates by comparison a matrix obtained by enduction after total elimination of the solvent according to the prior art.

FIG. 2 schematically illustrates a manufacturing process of a porous film electrode according to a possible implementation of the invention.

FIGS. 3 and 4 schematically illustrate the arrangement of screw elements in a modular corotative dual-screw extruder.

FIG. 5 schematically illustrates the effect of dispersive mixing.

FIG. 6 schematically illustrates the effect of distributive mixing.

FIG. 7a schematically illustrates in a top plan view a portion of a complex comprising a collector film and an electrode film, the collector delimiting the electrode on one edge.

FIG. 7b schematically illustrates in a top plan view a portion of a complex comprising a collector film and an electrode film, the collector delimiting the electrode on either side.

FIG. 8 schematically illustrates a scraper for forming the complex with the collector delimiting the electrode on one edge.

FIG. 9 schematically illustrates flanges arranged on laminating rollers for forming a complex with the collector delimiting the electrode on one edge.

FIG. 10 is a diagram schematically illustrating the steps of the manufacturing process of the porous electrode film.

FIG. 11 schematically illustrates points of introduction of different constituents in the dual-screw extruder, in keeping with a first implementation.

FIG. 12 schematically illustrates points of introduction of different constituents in the dual-screw extruder, in keeping with a second implementation.

Figure 1A:
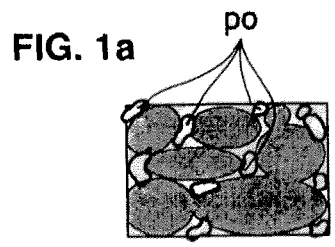
Figure 1B:
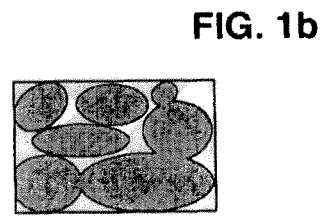
Figure 2:
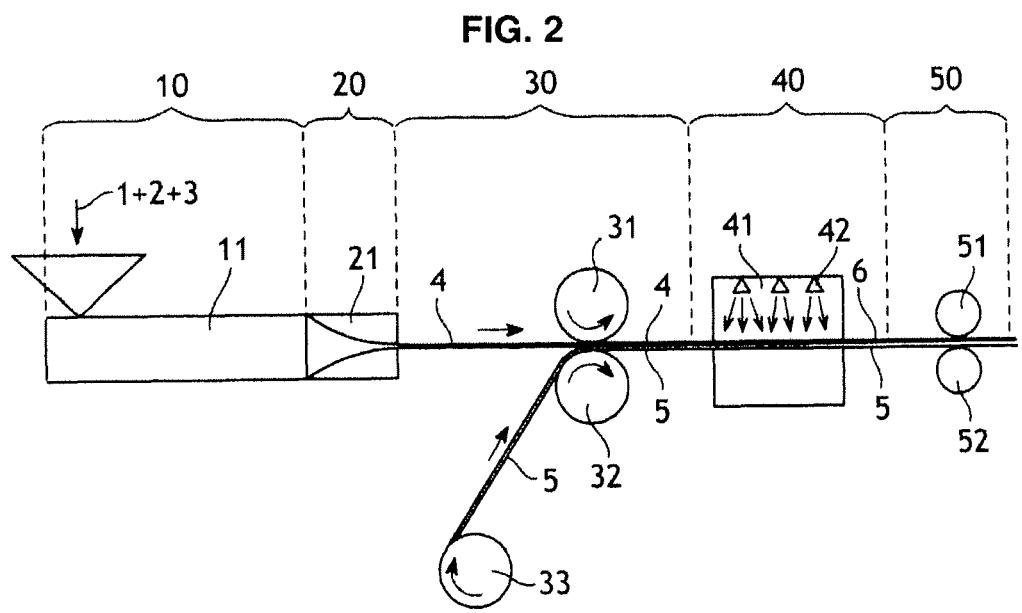

As is evident from FIGS. 2 and 10, the manufacturing process of a porous electrode film comprises the following main steps.

According to a first step 10, a polymer bond 1 in the form of powder, a softening agent 2 in the form of liquid and one or more charge(s) 3 in the form of powders or fibres are introduced to a dual-screw extruder 11. The constituents are mixed, combined as they pass through the extruder 11 so as to soften the polymer bond in the presence of the softener. The charges are dispersed as they pass through the extruder 11 so that the mixture is homogeneous. This is done by the choice of the succession of screw elements, certain sections of screw having a dispersive function such as illustrated in FIG. 5 and others have a distributive function such as shown in FIG. 6.

According to a second step 20, the mixture or paste exits from the extruder 11 via a flat extruder die 21 (or snap ring, or oblong cross-section). The passage of the mixture in the extruder die 21 results in obtaining a regular and homogeneous extrudate 4 in the form of a gel.

The dual-screw extruder can advantageously be replaced by a continuous mixer, of the type of equipment marketed under the trade mark Ko-mixer® Buss or of the type of equipment marketed under the trade mark Malaxeur continu Readco. The Ko-mixer® Buss is made up of a single screw with a screw thread interrupted in three places thus forming ribs. A rotation movement combined with an out-and-back translation movement is impressed on the screw. Inside the sheath of the screw conveyor three rows of fixed teeth generate shearing forces during movement with the ribs. The Malaxeur continu Readco is made up of two co-rotating shafts equipped with self-cleaning blades, generating shearing forces during movement. The advantage of this equipment is to offer a free volume greater than in a classic corotative dual-screw mixer, and thus offer a higher incorporation capacity of charges. The shearing forces are likewise better distributed and weaker, which becomes interesting when sensitive thermo-mechanically tools must be used.

For example, a snap ring extruder having a diameter of 15 mm produces an electrode film of a width of between 45 and 80 mm, of a thickness substantially equal to 150±10 μm, with an extrudate comprising around 80±1% by weight of dry material of active carbon of natural origin, physically active, having a specific surface of between 1000 and 2500 m²/g, around 20% by weight of dry material of polyvinylidene difluoride and hexafluoropropylene (PVDF/HFP) copolymer supplied by the company Solvay under the reference Solef® 21216 and around 50 to 60% by weight of propylene carbonate.

According to a third step 30, the extrudate 4 is pulled between two laminating rollers 31 and 32 of a laminator. The extrudate 4 is laminated on a film of metallic collector 5 between the heated two laminating rollers 31 and 32.

The function of the laminating rollers 31 and 32 is to spread the extrudate 4 on the collector film 5 and have the layer of extrudate 4 adhere to the collector film 5. This third step 30 leads to formation of a complex comprising a layer of extrudate 4 and a layer of collector 5.

According to a fourth step 40, the complex is pulled into a drying container 41 and subjected to a source of heat. To this effect, the drying container 41 is fitted with sources 42 for emitting infrared radiation to the complex.

Alternatively, this fourth drying step 40 can be done by convection of optionally dry hot air, or by conduction by having the complex scroll on heating rollers.

Also, this fourth drying step 40 can be carried out under a vacuum, in a neutral atmosphere such as nitrogen or argon, or in ambient atmosphere.

This fourth drying step 40 results in evaporation of all or part of the softening agent contained in the layer of extrudate 4 and causes solidification of the layer of extrudate 4. The softening agent eliminated by evaporation leaves room for pores in the layer of extrudate 4. The evaporation step 40 helps transform the layer of extrudate 4 into a porous electrode film 6.

Preferably, as is evident from FIG. 10, the softening agent recovered on leaving the evaporation system 40 is recycled into the dual-screw extruder 11.

For example, the evaporation of around 70% to 100% of the softening agent contained in a layer of extrudate 4 having a width equal to 120 mm and a thickness equal to 150 μm, the layer of extrudate 4 comprising 60% by weight of softening agent can be caused over a length of 15 m. To this end, the complex is pulled in a container whereof the first three meters are fitted with infrared radiation preheating means for heating the complex to 200° C. and the following twelve meters are fitted with convection means in hot air for heating the complex to 170° C.

Alternatively, it is possible to extract the softener by using a solvent, by immersion of the complex in a liquid compound miscible with the softener but a poor solvent of the bond polymer, then drying to evaporate the solvent of the softener. For example, diethyl or dimethyl ether can be used to extract the propylene carbonate utilised as softener of the polyvinylidene difluoride.

According to a fifth step 50, the complex comprising the collector layer 5 and the electrode layer 6 can be pulled between two calendering rollers and 52 heating or not. This fifth step 50 helps densify the electrode film 6 and optimise contact between the active charges, the conductive additives and the collector, which diminishes interface resistances.

According to a variant, the process may comprise an intermediate step between the first step 10 and the second step 20, the intermediate step consisting of making granules from the extrudate originating from the dual-screw 11 and feeding granules to be extruded to a monoscrew equipped with an extruder die plate or snap ring.

The dimensions of the extrudate 4 are selected so that the electrode film 6 has the following dimensions: a width of between 40 and 120 mm and a thickness of between 80 and 200 μm.

The substrate on which the electrode is deposited is a collector metallic film, preferably aluminium.

According to an embodiment of the invention, the electrode paste could be deposited on each face of an aluminium collector to produce an electrode-collector-electrode complex. Preferably, an etched aluminium film will be used to improve adhesion of the electrode on the collector.

According to a variant of the invention, the electrode paste could be deposited on a separator film to produce an electrode-separator complex.

According to an alternative, the calendering step can be carried out after a first step of partial drying. The polymer bond remains slightly plasticised and soft, thus favouring densification.

A dual-screw extruder 11 is formed by joining modular sections, each modular section comprising screw elements and a sheath. The modular sections can be interchanged for modifying the profile of the extruder.

The screw elements $z1$ to $z9$ can be transport elements or mixing elements.

Figure 3:
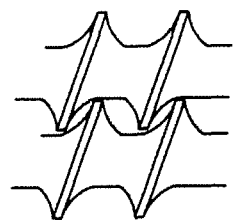

FIG. 3 schematically illustrates a transport element. Such a transport element comprises two helicoidal transport screws arranged side by side and capable of being driven in rotation about axes parallel to one another extending in the direction of advance of the material. The helicoidal screws permit the conveying of materials along the screw and generate weak shearing of the material.

Figure 4:
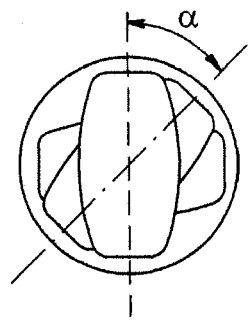

FIG. 4 schematically illustrates a mixing element. Such a mixing element comprises mixing palettes to be driven in rotation about a common axis of rotation extending in the direction of advance of the material. The mixing palettes cause high shearing of the material and thus enable the material to be mixed and the active charges to be dispersed in the material. The palettes have a thickness E and are arranged along the axis of rotation in forming a predetermined angle α between two successive palettes. The parameters E and α can be selected to produce a dispersive or distributive mixing action of the material.

For example, if the thickness E of the palettes is high or if α is close to 45°, a dispersive effect will result.

On the contrary, if α is close to 90°, a distributive effect will result.

FIG. 5 schematically illustrates the effect of dispersive mixing of the material. It is evident that the section of material is modified such that each material flux A, B, C, D is divided into a weaker section flux.

FIG. 6 schematically illustrates the effect of distributive mixing of the material. It is evident that the section of material is modified such that the portions A, B, C and D are intermixed.

According to a first embodiment illustrated in FIG. 11, the polymer 1 in powder form and the softening agent 3 in the form of liquid are introduced into the dual-screw extruder 11 in the first extruder zone and the charges 2 are introduced in the form of powder into a downstream zone.

This first embodiment favours softening of the polymer since the softening agent is first mixed with the polymer prior to being absorbed by the charges.

As an option, to produce a regular flow the charges 2 can be introduced in the extruder 11 via a lateral booster pump.

According to a second embodiment illustrated in FIG. 12, the polymer 1 and the charges 2 in the form of powders as well as the softener 3 in the form of liquid are introduced in the first zone of the extruder.

This second embodiment produces intimate mixing between the polymer 1 and the charges 2, since this is a mixture of two pulverulent constituents.

To favour the action of the softening agent, a contribution of thermal energy is made. The extrusion temperatures are selected as a function of the polymer/softening agent couple selected.

The speed of rotation of the screw of the dual-screw 11 is selected to obtain optimal dispersion and mixing quality as well as optimal flow.

As it leaves the extruder, the result is an electrode paste for supercondenser, at a charge rate of between 25% and 45%, comprising a mixture in the form of gel containing at least a polymer, at least a liquid softening agent, and at least an active charge, whereof the rate of softener in mass is between 50 and 70%.

The active charge of the paste can be active carbon or can comprise oxides of transition metals or carbon nanotubes. It can be in the form of powders or fibres.

The paste contains a conductivy additive present at around 1.5% in mass at this manufacturing stage, the additive being selected from acetylene black, carbon black or graphite or a mixture of these compounds.

The liquid softening agent is selected from the family of carbonates, for example from ethylene carbonate or propylene carbonate, or from the family of lactones such as γ-butyrolactone (GBT). It can also be selected from N-methylpyrrolidone (NMP), tetrahydrofurane (THF), acetone, cyclohexane, dimethylformamide (DMF), acrylonitrile, dimethylsulfoxide (DMSO), or methylethylketone (MEK). The electrode can be constituted from one or more liquid softener agents.

FIGS. 7a and 7b schematically illustrate a portion of a complex comprising a collector film 5 and an electrode film 6. The collector film 5 comprises a portion which projects from one side of the electrode film 6 (FIG. 7a) or from both sides of the electrode film (FIG. 7b). To this end, the collector film 5 has a width L5 greater than the width L6 of the electrode film 6.

In the case where the collector projects over the electrode from both sides, the complex will then be cut off in the direction of the length to make two complexes as described in FIG. 7b.

FIG. 8 schematically illustrates a first solution for forming a complex in which the collector film 5 projects from the width of the electrode 6.

According to this first solution, a scraper 34 is placed near the laminating rollers 31 and 32. The scraper 34 is placed at the outlet of the laminating rollers 31 and 32. The scraper 34 has an edge in contact with the collector film 5 and extending perpendicularly to the direction of unwinding of the complex comprising the collector layer 5 and the extrudate layer 4, on a lateral portion of the collector film 5. The function of the scraper 34 is to eliminate the extrudate 4 in the form of gel on a portion of the collector film 5 to form a portion of collector deprived of extrudate.

FIG. 9 schematically illustrates a second solution likewise for forming an electrode film 6 withdrawn relative to the collector film 5.

According to this second solution, two flanges 35, 36 are arranged in form of a wedge between the laminating rollers 31 and 32. The flanges 35, 36 limit the spreading of the extrudate 4 on the collector film 5 and define the width of the layer of extrudate 4 laminated.

By way of advantage, the laminating rollers 31 and 32 can be heated to benefit the laminating of the softened extrudate 4.

In the examples described hereinbelow, the electrochemical characteristics are measured according to the following operating mode:

The collector-electrode complexes are cut out by hollow punch to a diameter of 30 mm and the different constituents, two collector-electrode complexes, a separator paper of 65 μm in thickness, necessary for fabrication of the supercondenser are stacked symmetrically.

The resulting assembly is then impregnated by the selected liquid organic electrolyte and placed in an adapted electrochemical test cell. In this case, it is the γ-Butyrolactone-TetraEthylAmmoniumTetraFluoroBorate mixture concentrated at 1 M.

The cell is then tested at 25° C. in intentiostatic charge-discharge cycling under a current density of 8.5 mA/cm$^2$. The evolution of the potential at the terminals of the device is measured over time and as a function of different polarisations.

The two major parameters, capacity and series resistance, are measured directly from the cycling curves of the supercondenser:

series resistance (ohm) is measured from the ohmic drop at the start of discharge:

$$R_s = \Delta U / 2 I_{discharge}$$

capacity (F) is calculated from the ΔU/Δt slope of the variation curve of the potential over time and of the discharge current applied:

$$C = I_{discharge}(\Delta t / \Delta U)$$

The mass capacity (F/g) is obtained by dividing the capacity measured on the cell in question by the total mass of the two electrodes used to make up the cell.

The surface series resistance (ohm·cm$^2$) is obtained by multiplying the series resistance measured by the active surface of the cell.

The electrical conductivity in terms of the thickness is measured according to the following operating mode:

The electrodes are cut out by hollow punch to a diameter of 18 mm. The two faces of the sample are lacquered by using a silver suspension. A copper wire is fixed on each of the faces to attach the sample to the measuring instrument.

Currents I are applied through the sample and the resulting voltages U are recorded.

The conductivity of the film is obtained by the following formula:

$$\sigma = \frac{I \times L}{U \times S}$$

With:
σ the conductivity in Siemens per cm
I the current imposed in Amperes
U the voltage measured in volts
L the thickness of the film in cm
S the conduction surface, that is, the lacquered surface in cm$^2$ The gas permeability of the electrodes allows us to apprehend the penetration facility of the material by a gas. It is measured according to the following operating mode, on a sample of square electrode measuring 2 cm per side. The gas selected is diazote. The permeability is calculated by Darcy's law.

These measurements are taken by recording the inlet pressure of the gas ($P_e$), the difference in outlet pressure/to inlet pressure ($\Delta P$) by means of a differential manometer and the gas flow (Q) when the gas passes through the sample.

The following law determining the compressibility of the gas allows us to calculate the permeability:

$$k = \frac{Q \times e \times \eta \times (2(Pe - \Delta P))}{S \times ((Pe - \Delta P)^2 - Pe^2)}$$

with:
k=intrinsic permeability of the film ($m^2$)
Q=flow (mL/min)
e=thickness of the sample (cm)
$\eta$=viscosity of the fluid (Pa·s)
Pe=inlet pressure of the gas (Pa)
$\Delta P$=difference in pressure when the gas passes through the sample (Pa)
S=surface of the sample exposed to the gas ($cm^2$).

The BET surface of the electrode is the specific surface evaluated by the BET measurement such as described for example in the publication Technique of the Engineer Pbis 45-1 (Study of structure—measuring specific surface)—Jean Charpin and Bernard Rasneur.

EXAMPLE 1

Films of collector-electrode complex are formed, whereof the electrodes are obtained in a polymer mixture, a softening agent and an active charge. The mixtures are in the form of gel and are extruded by a dual-screw extruder via an extruder die snap ring of diameter 4 mm. The extrudates thus formed are deposited on the collector by laminating. The collector-paste complexes are dried to form the collector-electrode complexes.

The polymer is selected from the following compounds: polyvinylidene difluoride (PVDF), polyvinylidene difluoride and hexafluoropropylene copolymer (PVDF/HFP), styrene butadiene methyl methacrylate elastomer (SBM), polymethyl methacrylate (PMMA).

The softening agent is selected from the following compounds: propylene carbonate, a mixture of ethylene carbonate (50% by weight) and propylene carbonate (50% by weight), or γ-butyrolactone (GBT).

The active charge is constituted by a physically active natural active carbon, having a specific surface of between 1000 $m^2$/g and 1200 $m^2$/g.

The collector is a treated aluminium film of a thickness of 30 μm.

The electrodes obtained contain 80% by weight (±1%) of active charges and are 150 μm in thickness.

As a function of the nature of the bond and of the softener utilised, the results listed in Table 1 are obtained.

EXAMPLE 2

Films of collector-electrode complex are formed, whereof the electrodes are obtained in a polymer mixture, a softening agent and an active charge. The mixtures are in the form of gel and are extruded by a dual-screw extruder via an extruder die snap ring of diameter 4 mm. The extrudates thus formed are deposited on the collector by laminating. The collector-paste complexes are dried to form the collector-electrode complexes.

The polymer bond is a polyvinylidene difluoride and hexafluoropropylene copolymer (PVDF/HFP) supplied by the company SOLVAY under the reference SOLEF® 21216/1001

The softening agent is propylene carbonate (PC).

The active charge is constituted by a physically active natural active carbon, having a specific surface of between 1000 $m^2$/g and 1200 $m^2$/g.

The collector is a treated aluminium film of a thickness of 30 μm.

The rate of charges, the rate of bond and consequently the rate of softener necessary for implementing different electrodes are varied.

Table 2 lists all the characteristics measured on these different electrodes of 150 μm in thickness.

EXAMPLE 3

In the following examples, different morphologies and electrode characteristics are obtained as a function of the choice of the embodiment technology.

Example 3a: Gel Extrusion Method

Films of collector-electrode complex are formed, whereof the electrodes are obtained in a polymer mixture, a softening agent and an active charge. The mixtures are in the form of gel and are extruded by a dual-screw extruder via an extruder die snap ring of diameter 4 mm. The extrudates thus formed are deposited on the collector by laminating. The collector-paste complexes are dried to form the collector-electrode complexes.

The polymer bond is a polyvinylidene difluoride and hexafluoropropylene copolymer (PVDF/HFP) supplied by the company SOLVAY under the reference SOLEF® 21216/1001

The softening agent is propylene carbonate (PC).

The active charge is constituted by a physically active natural active carbon, having a specific surface of between 1000 $m^2$/g and 1200 $m^2$/g.

The collector is a treated aluminium film of a thickness of 30 μm.

The electrode obtained contains 80% by weight of active charges and has a thickness of 150 μm.

Example 3b: Dry Extrusion Method

An electrode is formed by mixing several polymers and an active charge.

The first polymer is ethylene polyoxide from DOW CHEMICAL (POE 200 M). The second polymer is an ethylene glycol polyoxide from DOW CHEMICAL (PEG 8 M). These polymers are selected for their property of solubility in water.

The polymer bond is a copolymer of polyvinylidene difluoride and hexafluoropropylene (PVDF/HFP) supplied by the company SOLVAY under reference SOLEF® 21510.

The active charge is constituted by a physically active natural active carbon, having a specific surface of between 1000 $m^2$/g and 1200 $m^2$/g.

The mixture is extruded by a corotative dual-screw extruder via an extruder die snap ring of diameter 4 mm. The granules obtained are introduced to a monoscrew of length 30 D to produce a film of 100 μm in thickness. Finally, the last step consists of dipping the film in a water bath at 60° C. for 5 minutes to extract part of the hydrosoluble polymer. The film is then dried at 80° C. over 24 H.

The final mass proportions of the constituents in the electrode are the following:
Active carbon: 49%
POE 200M: 16%
PEG 8M: 13%
PVDF 21510: 22%

Example 3c: PTFE Method

An electrode is formed by mixing a polymer and an active charge.

The active charge (98% in mass of the mixture) is placed in suspension in ethanol in excess. The PTFE (2% in mass of the mixture) is then added to the suspension. The suspension is heated to 75° C. so as to evaporate the ethanol. The viscous paste thus obtained is then mixed on a flat support then drawn using a roller as a laminated paste to produce a self-supported film. This film is then dried at 80° C. for 1 H.

Table 3 has the comparative characteristics of the electrodes obtained with the different technologies described earlier.

Figure 13:
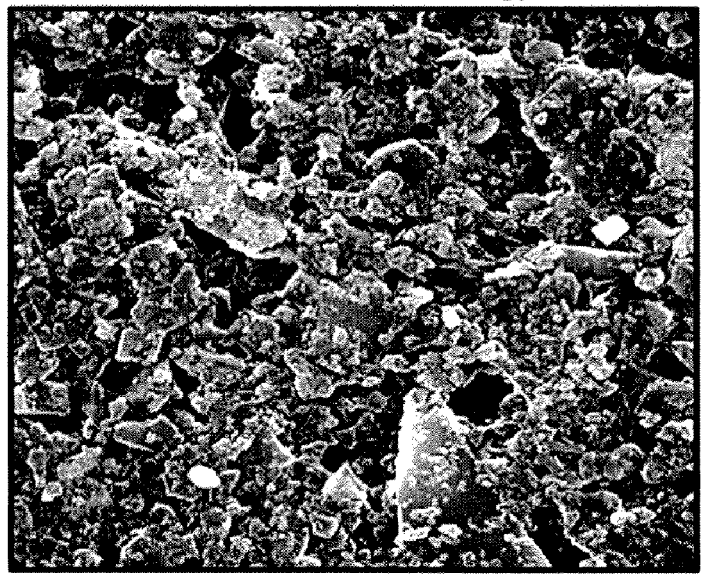
FIG. 13 illustrates the morphology of an electrode according to the invention obtained by gel extrusion.
Figure 14:
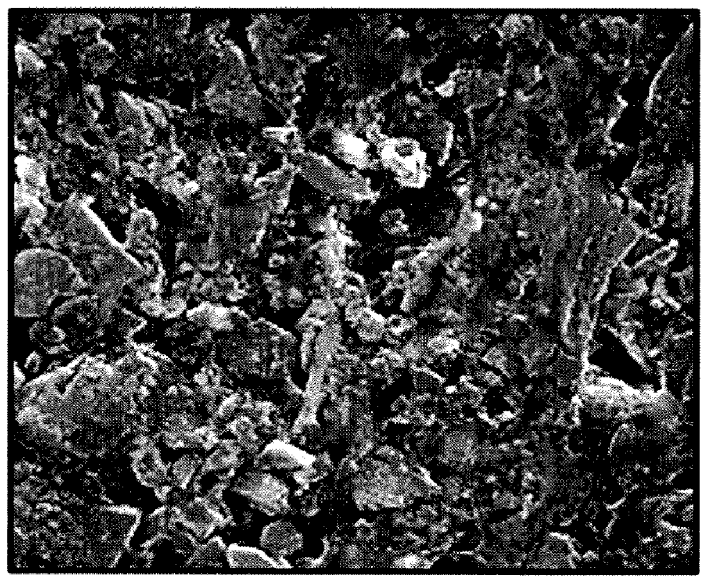
FIG. 14 illustrates the morphology of an electrode according to the prior art obtained by the dry extrusion method.
Figure 15:
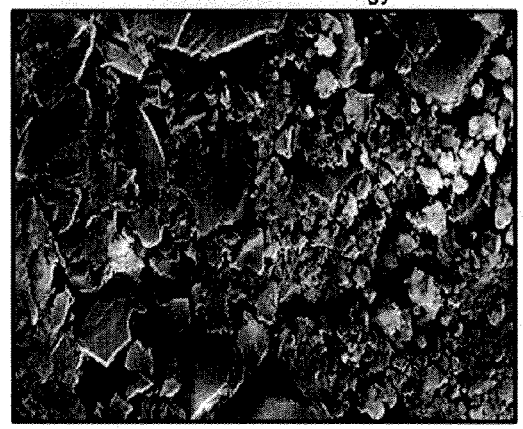
FIG. 15 illustrates the morphology of an electrode according to the prior art obtained by extrusion calendering via PTFE with fibrillation.

Otherwise, MEB photographs of the films previously described were taken. The morphology of the electrode obtained within the scope of the present invention, by gel extrusion method (FIG. 13), is thus compared to those obtained in the case of a classic electrode from a dry extrusion method (FIG. 14) and in the case of a classic electrode made in a laboratory and based on PTFE (FIG. 15). These photographs underline differences in notable morphologies generated by these technologies:

With gel extrusion technology according to the invention, the electrode obtained has significant porosity. The polymer bond is in the form of a dispersed phase of particulate or granular morphology forming a discontinuous matrix.

In the case of dry method technology according to the prior art, the electrode obtained is clearly less porous. The polymer bond is in the form of a continuous matrix.

In the case of PTFE technology according to the prior art, the polymer bond is in the form of a fibrillated matrix.

EXAMPLE 4

A collector-electrode film complex is formed, whereof the electrodes are obtained in a polymer mixture, a softening agent and an active charge. The mixtures are in the form of gel and are extruded by a dual-screw extruder via an extruder die snap ring of diameter 4 mm. The extrudates thus formed are deposited on the collector by laminating. The collector-paste complexes are dried to form the collector-electrode complexes.

The polymer bond is a polyvinylidene difluoride and hexafluoropropylene copolymer (PVDF/HFP) supplied by the company ATOFINA under the reference KYNAR®FLEX 2821 at 20% in electrode mass.

The softening agent is propylene carbonate (PC) at 56% in mass mixture.

The active charge is constituted by a physically active natural active carbon, having a specific surface of between 1000 $m^2/g$ and 1200 $m^2/g$.

The collector is a treated aluminium film of a thickness of 30 μm.

An electrode film containing 80% by weight of charges is produced, having the following characteristics:
mass capacity of 37.1 F/g,
series resistance of 8.0 Ohm·$cm^2$,
density of 0.60,
porosity of 70%.

EXAMPLE 5

A collector-electrode film complex is formed, whereof the electrodes are obtained in a polymer mixture, a softening agent and an active charge. The mixtures are in the form of gel and are extruded by a dual-screw extruder via an extruder die snap ring of diameter 4 mm. The extrudate thus formed is deposited on the collector by laminating. The collector-paste complexes are dried to form the collector-electrode complexes.

The polymer bond is a polyvinylidene difluoride and hexafluoropropylene copolymer (PVDF/HFP) supplied by the company SOLVAY under the reference SOLEF® 21216/1001 at 15% in electrode mass.

The softening agent is propylene carbonate (PC) at 55% in mass mixture.

The active charges are constituted by a physically active natural active carbon, having a specific surface of between 1400 $m^2/g$ and 1600 $m^2/g$ and denser than that used in the preceding examples.

The collector is a treated aluminium film of a thickness of 30 μm.

An electrode film is produced, containing 85% by weight of charges and which has the following characteristics:
a mass capacity of 41.5 F/g,
a series resistance of 8.6 Ohm·$cm^2$,
a density of 0.70,
a porosity of 66%,
permeability to gas of 1.1 mDarcy,
a surface BET of 969 $m^2/g$,
electrical conductivity in terms of the thickness of 0.8 S/cm.

EXAMPLE 6

A collector-electrode film complex is formed, whereof the electrodes are obtained in a polymer mixture, a softening agent and an active charge. The mixtures are in the form of gel and are extruded by a dual-screw extruder via an extruder die snap ring of diameter 4 mm. The extrudate thus formed is deposited on the collector by laminating. The collector-paste complexes are dried to form the collector-electrode complexes.

The polymer bond is a polyvinylidene difluoride and hexafluoropropylene copolymer (PVDF/HFP) supplied by the company SOLVAY under the reference SOLEF® 21216/1001 at 10% in electrode mass.

The softening agent is γ-Butyrolactone at 61% in mass mixture.

The active charges are constituted by a physically active natural active carbon, having a specific surface of between 1800 $m^2/g$ and 2000 $m^2/g$.

The collector is a treated aluminium film of a thickness of 30 μm.

An electrode film is produced, containing 90% by weight of charges and which has the following characteristics:
a mass capacity of 50.1 F/g,
a series resistance of 6.7 Ohm·$cm^2$,
a density of 0.53,
a porosity of 75%.

EXAMPLE 7

A collector-electrode film complex is formed, whereof the electrodes are obtained in a polymer mixture, a softening agent and an active charge. The mixtures are in the form of gel and are extruded by a dual-screw extruder via an extruder die snap ring of diameter 4 mm. The extrudate thus formed is deposited on the collector by laminating. The collector-paste complex is dried to form the collector-electrode complexes.

The polymer bond is a polyvinylidene difluoride and hexafluoropropylene copolymer (PVDF/HFP) supplied by the company SOLVAY under the reference SOLEF® 21216/1001 at 10% in electrode mass.

The softening agent is propylene carbonate (PC) at 67% in a mass mixture.

The active charges are constituted by a physically active natural active carbon, having a specific surface of between 1800 $m^2/g$ and 2000 $m^2/g$.

20% in mass of additive conductivy is advantageously added to the formulation.

The collector is an etched aluminium film of a thickness of 20 μm.

An electrode film is produced, containing 90% by weight of charges and which has the following characteristics:
  a mass capacity of 40.3 F/g
  a series resistance of 5.8 Ohm·$cm^2$
  a density of 0.67
  a porosity of 67%
  a surface BET of 985 $m^2/g$ The dynamic spectrometry in the molten state allows us to measure the elasticity modules of the electrode paste at a given temperature and characterise the gel. The electrode paste from the mixture described hereinabove was formed as a disc of diameter 25 mm and thickness of 650 μm.

This rheological characterisation was done using a rheometer with controlled constraint, the AR2000 by TA Instruments, in 2D geometry. The diameter of the plates is 25 mm. All the measurements were made in the linear field. The constraint applied is 200 Pa. The 100 Hz.

The analysis temperatures are typical values of extrusion temperature.

Figure 16:
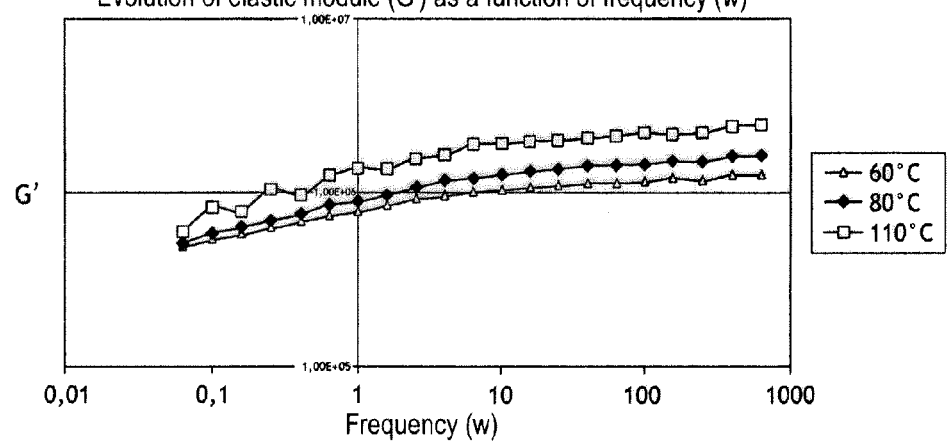
FIG. 16 shows the results of the rheological characterisation of the electrode paste manufactured.

The results thus obtained are illustrated in FIG. 16. They allow us to conclude that the elastic module is between $10^4$ and $10^8$ Pa.

Table 4 indicates the quantity of softening agent necessary for forming the electrodes whereof the rate of charges is 80% in mass as a function of the specific surface BET of the active charges.

TABLE 1

| Polymer | Supplier | Grade | Softener | % softener | Mass capacity F/g | Series resistance ohm·$cm^2$ | Density g/$cm^3$ | Porosity % |
|---|---|---|---|---|---|---|---|---|
| PVDF | Solvay | 6010 | PC | 55 | 36.6 | 7.2 | 0.60 | 70 |
|  | Solvay | 6020 | PC | 60 | 31.6 | 7.1 | 0.60 | 70 |
|  |  |  | EC/PC | 60 | 35.2 | 5.3 | 0.53 | 74 |
|  |  |  | GBT | 57 | 34.1 | 6.4 | 0.62 | 69 |
|  | Atofina | 721 | PC | 60 | 36.6 | 6.3 | 0.57 | 72 |
|  | Atofina | 761 | PC | 60 | 34.4 | 6.4 | 0.57 | 72 |
|  | Atofina | 500 | PC | 56 | 35.8 | 7.9 | 0.63 | 69 |
|  | Atofina | ADX121 | PC | 56 | 36.7 | 6.5 | 0.61 | 70 |
|  | Kureha | W9100 | PC | 59 | 36.8 | 5.8 | 0.56 | 71 |
| PVDF/HFP | Solvay | 21510 | PC | 55 | 34.1 | 8.1 | 0.60 | 70 |
|  | Solvay | 21216 | PC | 54 | 35.7 | 8.1 | 0.63 | 69 |
|  |  |  | EC/PC | 60 | 38.5 | 6.5 | 0.57 | 72 |
|  |  |  | GBT | 58 | 36.6 | 6.9 | 0.51 | 75 |
|  | Atofina | 2501 | PC | 55 | 35.2 | 8.6 | 0.61 | 70 |
|  | Atofina | 2821 | PC | 56 | 37.1 | 8 | 0.60 | 70 |
|  | Kureha | KF#2300 | PC | 60 | 37.7 | 7.1 | 0.60 | 70 |
| SBM | Atofina | AFX342 | GBT | 56 | 37.3 | 8.8 | 0.55 | 73 |

TABLE 2

| Rate of charges % | Rate of bond % | Rate of softener % | Capacity F/g | Series resistance ohm·$cm^2$ | S BET ($cm^2/g$) | Permeability (mDarcy) | Density (g/cm3) | Porosity % |
|---|---|---|---|---|---|---|---|---|
| 80 | 20 | 56 | 36.0 | 6.8 | x | x | 0.66 | 67 |
| 85 | 15 | 66 | 37.3 | 5.4 | 743 | 2.4 | 0.51 | 75 |
| 90 | 10 | 67 | 38.7 | 4.6 | x | x | 0.52 | 75 |

TABLE 3

| Example | Technology | Rate of charges % | Capacity F/g | Series resistance ohm·$cm^2$ | S BET ($cm^2/g$) | Permeability (mDarcy) | Density (g/cm3) | Porosity % |
|---|---|---|---|---|---|---|---|---|
| 3a | Extrusion gel | 85 | 36.2 | 5.0 | 743 | 2.4 | 0.52 | 75 |
| 3b | Dry extrusion | 49 | 20.0 | 12.0 | 62 | 0.2 | 1.02 | 42 |
| 3c | PTFE | 98 | 43.9 | 5.1 | 1066 | 0.9 | 0.49 | 77 |

TABLE 4

| Specific BET surface of active charges (m²/g) | Supplier | Density of active charges (g/cm³) | Rate of softening agent in the mixture (mass %) |
|---|---|---|---|
| 3000 | Osaka | 0.36 | 72 |
| 1000-1200 | Ceca | 0.48 | 66 |
| 2000 | Osaka | 0.49 | 63 |
| 1500 | Kuraray | 0.58 | 59 |
| 1700 | Kuraray | 0.58 | 56 |
| 1700 | Kuraray | 0.62 | 55 |
| 1500 | Osaka | 0.64 | 54 |
| 1450 | Ceca | 0.67 | 55 |

The invention claimed is:

1. A process for manufacturing a porous substrate—electrode complex (6) at a charge rate greater than or equal to 80% for a supercondenser comprising the steps of:
   preparing a mixture containing at least a polymer (1), at least a liquid porogenic softening agent (3), and at least an active charge (2),
   extruding the mixture in the form of paste,
   depositing the paste on the substrate and laminating it,
   treating the complex thus formed to eliminate all or part of the softening agent (3) and creating porosity in the electrode.

2. The process as claimed in claim 1, wherein the liquid softening agent (3) contained in the mixture is insufficient to completely solubilise the polymer such that the mixture forms a gel during the extrusion process.

3. The process as claimed in claim 1, wherein the electrode mixture is deposited on either side of a substrate.

4. The process as claimed in claim 1, wherein the substrate is a current collector constituted by a metallic film.

5. The process as claimed in claim 1, wherein the substrate is a current collector aluminium film.

6. The process as claimed in claim 1, wherein the substrate is an aluminium film etched in the current collector surface.

7. The process as claimed in claim 4, wherein the collector has a thickness of between 15 and 50 μm.

8. The process as claimed in claim 4, wherein the complex comprises a conductive sub-layer disposed between the collector and the electrode.

9. The process as claimed in claim 8, wherein the conductive sub-layer is formed by deposit on the metallic film.

10. The process as claimed in claim 8 or 9, wherein the conductive sub-layer is metallic.

11. The process as claimed claim 8, wherein the sub-layer includes a metallic nitride or carbide.

12. The process as claimed in claim 8, wherein the sub-layer is carbonated.

13. The process as claimed in claim 12, wherein the carbonated sub-layer contains more than 50% in mass of a conductive carbonated material.

14. The process as claimed in claim 8, wherein the sub-layer has a thickness of between 0.1 and 25 m.

15. The process as claimed in claim 8, wherein the sub-layer is obtained by gel extrusion.

16. The process as claimed in claim 8, wherein the sub-layer is deposited by at least one of enduction, pulverisation and evaporation on the collector.

17. The process as claimed in claim 1, wherein the substrate on which the electrode film is deposited is a separator.

18. The process as claimed in claim 1, wherein the paste is in the form of a gel.

19. The process as claimed in claim 1, wherein the liquid softening agent (3) is eliminated fully or partially by evaporation.

20. The process as claimed in claim 1, wherein the liquid softening agent (3) is eliminated fully or partially by solvent.

21. The process as claimed in claim 1, wherein the active charges (2) comprise active carbon.

22. The process as claimed in claim 21, wherein the active carbon is in the form of powders or fibres.

23. The process as claimed in any one of claim 21 or 22, wherein the active carbon has a specific surface of between 1000 and 2500 m²/g.

24. The process as claimed in claim 1, wherein the active charges (2) comprise oxides of transition metals.

25. The process as claimed in claim 1, wherein the active charges (2) comprise carbon nanotubes.

26. The process as claimed in claim 1, wherein at least a conductive additive is added to the mixture.

27. The process as claimed in claim 26, wherein the conductive additive is selected from acetylene black, carbon black or graphite or a mixture of these compounds.

28. The process as claimed in claim 1, wherein at least % in mass of conductive additive is incorporated in the mixture.

29. The process as claimed in claim 1, wherein the mixture contains a polymer (1) selected from the family of fluoropolymers.

30. The process as claimed in claim 29, wherein the mixture contains polyvinylidene difluoride (PVDF), in the form of homopolymer or copolymer singly or in a mixture.

31. The process as claimed in claim 30, wherein the PVDF copolymer is based on hexafluoropropylene (HFP) or chlorotrifluoroethylene (CTFE).

32. The process as claimed in claim 31, wherein the PVDF copolymer comprises at most 50% of hexafluoropropylene monomer (HFP) or of chlorotrifluoroethylene (CTFE) copolymerised with vinylidene fluoride.

33. The process as claimed in claim 1, wherein the mixture contains a polymer (1) selected from the family of polyethers.

34. The process as claimed in claim 33, wherein the mixture contains polyoxyethylene (POE).

35. The process as claimed in claim 1, wherein the mixture contains a polymer (1) selected from the family of polyacrylics.

36. The process as claimed in claim 35, wherein the mixture contains polymethyl methacrylate (PMMA) or of the polyacrylonitrile (PAN).

37. The process as claimed in claim 1, wherein the mixture contains a polymer (1) selected from the family of elastomers.

38. The process as claimed in claim 1, wherein the mixture contains a polyvinyl copolymer.

39. The process as claimed in claim 38, wherein polyvinyl copolymers comprise styrene-butadiene-PMMA (SBM) elastomer ter-polymers or styrene-acrylonitrile (SAN) elastomer copolymers.

40. The process as claimed in claim 1, wherein the mixture contains a liquid softening agent (3) selected from the family of carbonates.

41. The process as claimed in claim 40, wherein the liquid softening agent (3) is selected from ethylene carbonate or propylene carbonate, singly or in a mixture.

42. The process as claimed in claim 1, wherein the liquid softening agent (3) is a lactone.

43. The process as claimed in claim 1, wherein the extrusion of the mixture is carried out using a dual-screw extruder.

44. The process as claimed in claim 1, wherein the extrusion of the mixture is carried out using a continuous mixer.

45. The process as claimed in claim 1, wherein a calendering step is added after the laminating of the complex.

46. The process as claimed in claim 1, wherein the electrode film obtained has a thickness of between 80 and 200 μm.

47. The process as claimed in claim 38, wherein the polyvinyl copolymer is one of butadiene, isopropene or styrene copolymer, and acrylics.

48. The process as claimed in claim 42, wherein the lactone is selected from γ-butyrolactone (GIST), N-methylpyrrolidone (NMP), tetrahydrofurane (THF), acetone, cyclohexane, dimethylformamide (DMF), acrylonitrile, dimethylsulfoxide (DMSO), or methylethylketone (MEK) singly or in a mixture.

* * * * *

UNITED STATES PATENT AND TRADEMARK OFFICE
CERTIFICATE OF CORRECTION

PATENT NO. : 8,211,188 B2
APPLICATION NO. : 11/883451
DATED : July 3, 2012
INVENTOR(S) : Hélène Drevet et al.

It is certified that error appears in the above-identified patent and that said Letters Patent is hereby corrected as shown below:

In the Claims, Column 17, Claim 14, line 55, please delete "25 m" and insert -- 25 $\mu$m --.

Column 18, Claim 23, line 7, please delete "claim" and insert -- claims --.

Column 18, Claim 28, line 19, please delete "least %" and insert -- least 1.5% --.

Column 19, Claim 48, line 5, please delete "GIST" and insert -- GBT --.

Signed and Sealed this
Fifth Day of February, 2013

Teresa Stanek Rea
*Acting Director of the United States Patent and Trademark Office*